United States Patent
Chang

(10) Patent No.: US 7,324,581 B2
(45) Date of Patent: Jan. 29, 2008

(54) APPARATUS FOR MAPPING AND SPREADING DATA SYMBOLS IN MOBILE COMMUNICATION SYSTEM

(75) Inventor: Seok Il Chang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 737 days.

(21) Appl. No.: 10/734,206

(22) Filed: Dec. 15, 2003

(65) Prior Publication Data

US 2004/0125861 A1 Jul. 1, 2004

(30) Foreign Application Priority Data

Dec. 13, 2002 (KR) .................. 10-2002-0079815

(51) Int. Cl.
*H04B 1/00* (2006.01)
(52) U.S. Cl. ..................... 375/146; 375/261
(58) Field of Classification Search ............... 375/135, 375/146, 261, 279, 295, 298, 308
See application file for complete search history.

(56) References Cited

U.S. PATENT DOCUMENTS

| | | | | |
|---|---|---|---|---|
| 5,724,382 A * | 3/1998 | Maruyama | ............... | 375/141 |
| 6,031,874 A * | 2/2000 | Chennakeshu et al. | ..... | 375/262 |
| 6,393,047 B1 | 5/2002 | Popovic' | ................. | 375/140 |
| 2002/0012403 A1 | 1/2002 | McGowan et al. | ......... | 375/295 |
| 2002/0098795 A1 * | 7/2002 | Brede et al. | ............... | 455/3.01 |
| 2002/0122464 A1 * | 9/2002 | Dodge | ....................... | 375/141 |
| 2002/0172260 A1 * | 11/2002 | Rice | ........................... | 375/130 |
| 2003/0210750 A1 * | 11/2003 | Onggosanusi et al. | ...... | 375/295 |
| 2004/0008737 A1 * | 1/2004 | McClellan | .................. | 370/535 |

FOREIGN PATENT DOCUMENTS

| | | |
|---|---|---|
| CN | 1254996 A | 5/2000 |
| EP | 0 716 529 A2 | 6/1996 |
| JP | 2001-501798 | 2/2001 |
| JP | 2002-520922 | 7/2002 |

OTHER PUBLICATIONS

Japanese Office Action dated Jun. 2, 2006.
European Search Report, Oct. 2005.

* cited by examiner

*Primary Examiner*—Chieh M. Fan
*Assistant Examiner*—Freshteh N Aghdam
(74) *Attorney, Agent, or Firm*—Ked & Associates, LLP

(57) ABSTRACT

The present invention discloses an apparatus for mapping and spreading data symbols in a mobile communication system which can improve efficiency of the system by performing data symbol mapping and spreading processes by using binary operations. The apparatus maps and spreads data symbols by using binary operations when quadrature phase shift keying modulation is performed in a mobile communication time division duplex mode.

28 Claims, 2 Drawing Sheets

APPARATUS FOR MAPPING AND SPREADING DATA SYMBOLS IN MOBILE COMMUNICATION SYSTEM

BACKGROUND OF THE INVENTION

1. Field of the Invention

The present invention relates to a mobile communication system, and more particularly to an apparatus and method for mapping and spreading data symbols in a mobile communication system.

2. Background of the Related Art

In general, when quadrature phase shift keying (QPSK) modulation is used in a 3G mobile communication time division duplex (TDD) mode, physical channel mapped binary information is mapped to one symbol by 2 bits according to characteristics of the QPSK modulation, and the mapped symbols pass through a channelizing process and a scrambling process. Here, a spreading process including the mapping and scrambling processes has been disclosed in U.S. Pat. No. 6,393,047.

However, mapping tables and complex number multiplications are required for performing the symbol mapping, channelizing and scrambling processes. Therefore, operation processing time and complexity of software and hardware of a mobile communication system both increase.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, it is an object of the present invention to provide an apparatus and method for mapping and spreading data symbols in a mobile communication system which can improve efficiency of the system by performing data symbol mapping and spreading processes by using binary operations instead of using complex number operations, when quadrature phase shift keying (QPSK) modulation is performed in a mobile communication time division duplex (TDD) mode.

In order to achieve the above-described object of the invention, an apparatus for mapping and spreading data symbols in a mobile communication system maps and spreads the data symbols by using binary operations when the QPSK modulation is performed in the mobile communication TDD mode.

According to one embodiment of the invention, an apparatus for mapping and spreading data symbols in a mobile communication system includes a binary channelized data symbol generator for generating imaginary coefficients of binary information mapped symbols, a binary counter for counting the imaginary coefficients, a first. XOR circuit for calculating XOR values for the most significant bit and the least significant bit of the binary counter, and outputting the resulting values, a binary scrambling code generator for mapping a scrambling code to 0 and 1, and outputting the mapped values, a second XOR circuit for calculating XOR values for the output value from the binary scrambling code generator, the output value from the first XOR circuit, and a real coefficient of the symbol mapped by the binary channelized data symbol generator, a mapper for mapping the values calculated by the second XOR circuit to binary numbers such as 1 and −1, and outputting the mapped values, and a switch for outputting the output values from the mapper to a real part and an imaginary part according to the least significant bit of the binary counter. The values calculated by the second XOR circuit are binary numbers such as 0 and 1 which are divided into a real part and an imaginary part.

According to another embodiment of the invention, a method of mapping and spreading data symbols in a mobile communication system includes generating imaginary coefficients of binary information mapped symbols, counting the imaginary coefficients, calculating XOR values for the most significant bit and the least significant bit of the count value, outputting resulting values, mapping a scrambling code to 0 and 1, outputting mapped values, calculating XOR values for the mapped output values, output resulting values, and a real coefficient of a mapped symbol, mapping the calculated XOR values to binary numbers and outputting the mapped calculated XOR values, and outputting the outputted mapped calculated XOR values to a real part and an imaginary part according to the least significant bit. The calculated XOR values are binary numbers which are divided into a real part and an imaginary part.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF PREFERRED EMBODIMENTS

An apparatus and method for mapping and spreading data symbols in a mobile communication system which can improve efficiency of the system by performing data symbol mapping and spreading processes by using binary operations instead of using complex number operations, when quadrature phase shift keying (QPSK) modulation is performed in a mobile communication time division duplex (TDD) mode will now be described in detail.

Figure 1:
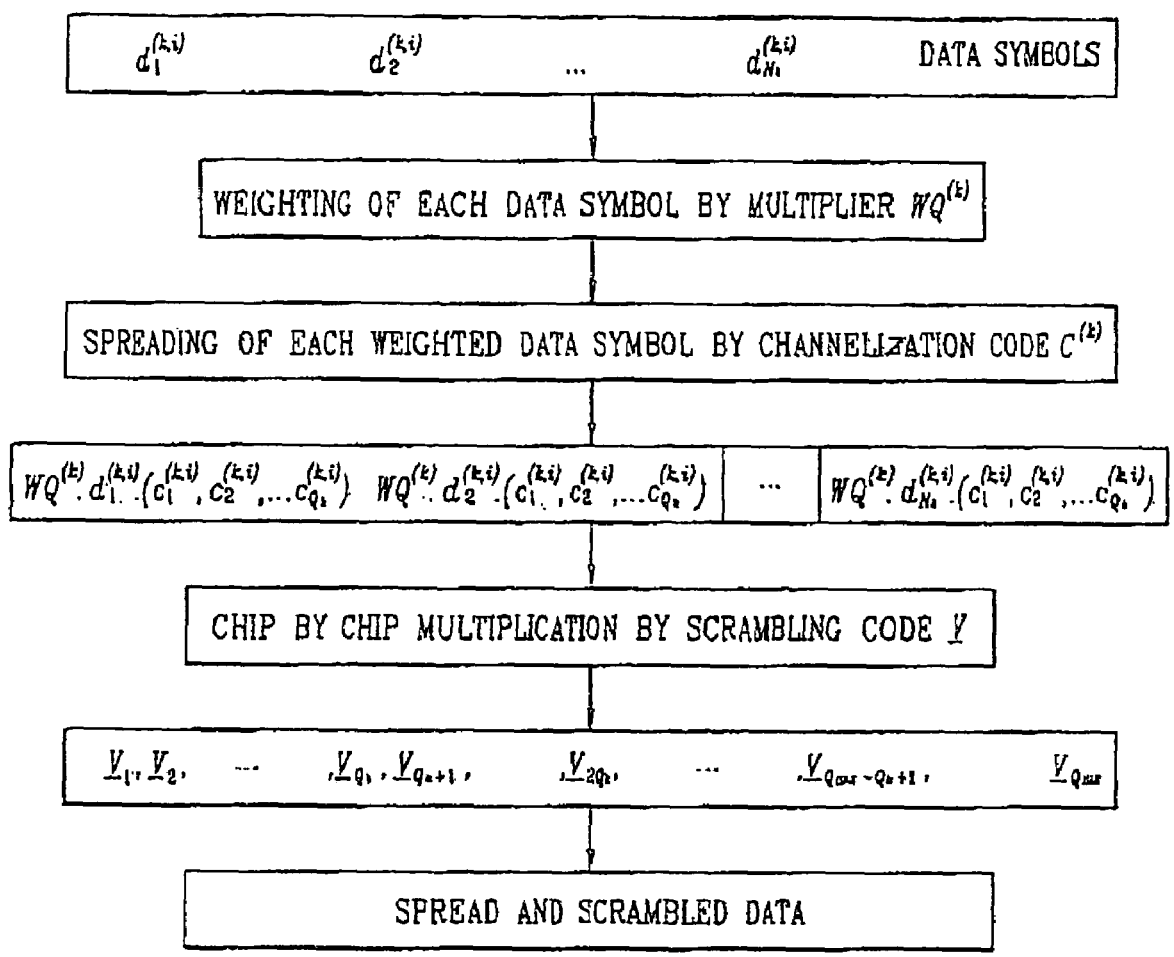
FIG. 1 is an exemplary diagram illustrating a data symbol spreading process.

FIG. 1 is an exemplary diagram illustrating a data symbol spreading process. Referring to FIG. 1, binary data is mapped to one symbol by 2 bits using QPSK constellation, and the mapped symbols pass through the spreading process.

The spreading process is roughly divided into a two-part process. The first process spectrum-spreads and channelizes data symbols, and the second process scrambles the channelized data. Here, the data symbols are all QPSK symbols and represented by complex numbers. In addition, channelizing codes and scrambling codes are comprised of complex numbers.

Therefore, the spreading process of FIG. 1 is performed by complex number multiplications. In accordance with the present invention, the complex number multiplications are converted into binary operations, and the binary operations are performed. The spreading process is represented by the following formula:

$$d^{(k,i)}(t) = \sum_{n=1}^{N_k} d_n^{(k,i)} w_{Q_k}^{(k)} \sum_{q=1}^{Q_k} C_{1+[[(n-1)Q_k+q-1]\bmod Q_k]}^{(k)} \cdot \underline{v}_{1+[[(n-1)Q_k+q-1]\bmod Q_{MAX}]} \quad (1)$$

Here, $d^{(k,i)}$ represents complex number data allocated to two data parts of each burst, $N_k$ represents a number of data symbols allocated to each data part, and $Q_k$ represents a spreading factor.

The scrambling code $\underline{v}$ is generated by using a binary scrambling code having the length of 16 defined under the standard (for example, 3GPP TS 25.223 V5.0.0, TDD LCR standard, pp 19), as represented by following formula, and repeatedly used according to the length of coded data.

$$\underline{v}_i = (j)^i \cdot v_i, \ v_i \in \{1,-1\}, \ i=1,K,16 \quad (2)$$

Here, $v_i$ represents each element of the scrambling code allocated to a cell, and $j$ represents a complex number $\sqrt{-1}$.

Figure 2:
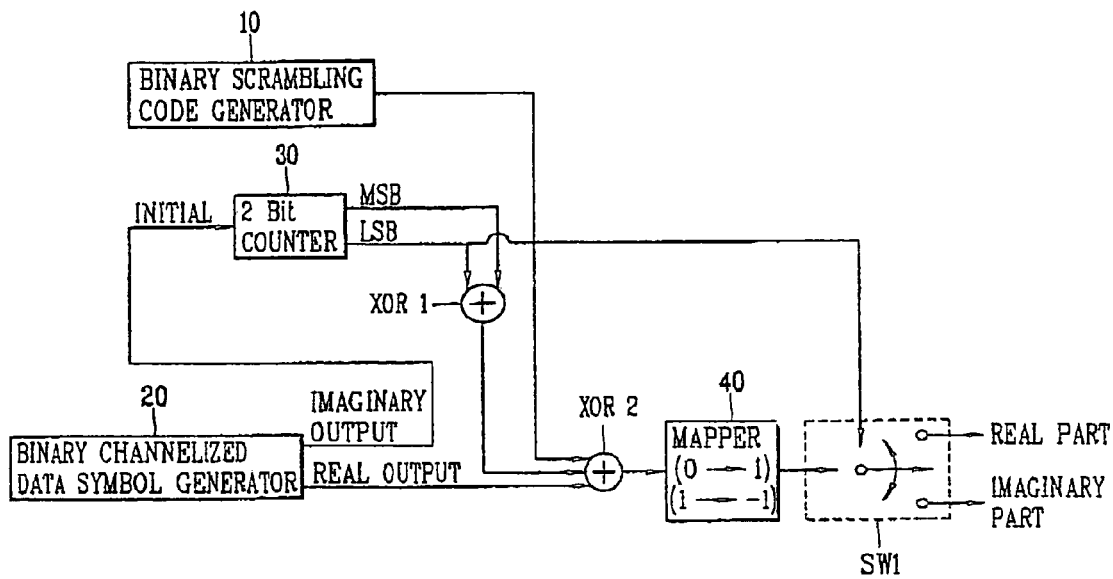
FIG. 2 is a block diagram illustrating an apparatus for mapping and spreading data symbols in a mobile communication system in accordance with a preferred embodiment of the present invention.

FIG. 2 is a block diagram illustrating an apparatus for mapping and spreading data symbols in a mobile communication system in accordance with a preferred embodiment of the present invention, namely an apparatus for performing symbol mapping, channelizing and scrambling processes by using binary operations. In the above standard, a binary scrambling code is defined as a code including ±1 and having a length of 16. However, a binary scrambling code of FIG. 2 includes 0 and 1 and has a length of 16. This code is repeatedly generated by a binary scrambling code generator 10. In accordance with the present invention, the binary scrambling code ±1 defined in the original standard (for example, 3GPP TS25.223 V5.0.0) is mapped to 0 and 1. For example, +1 of the binary scrambling code is mapped to 0, and −1 of the binary scrambling code is mapped to '1'. As a result, the code mapped to 0 and 1 is used. Accordingly, the binary scrambling code is composed of 0 and 1.

As illustrated in FIG. 2, the apparatus for mapping and spreading data symbols in the mobile communication system includes a binary channelized data symbol generator 20 for generating imaginary coefficients (imaginary outputs) of binary information mapped symbols, a binary counter 30 (e.g., a 2 bit counter) for receiving the imaginary coefficients from the binary channelized data symbol generator 20, and counting the imaginary coefficients, a first XOR circuit XOR1 for calculating XOR values for the most significant bit and the least significant bit of the binary counter 30, and outputting the resulting values, a binary scrambling code generator 10 for mapping a scrambling code to 0 and 1, and outputting the mapped values; a second XOR circuit XOR2 for calculating XOR values for the output value from the binary scrambling code generator 10, the output value from the first XOR circuit XOR1, and a real coefficient (real output) of the mapped symbol from the binary channelized data symbol generator 20, and outputting the resulting values, a mapper 40 for mapping the output values (binary numbers such as 0 and 1 divided into real and imaginary parts) from the second XOR circuit XOR2 to binary numbers such as 1 and −1, respectively, and outputting the mapped values, and a switch SW1 for outputting the output values from the mapper 40 to a real part and an imaginary part according to the least significant bit of the binary counter 30.

The operation of the apparatus for mapping and spreading data symbols in the mobile communication system in accordance with the present invention will now be explained in detail with reference to FIG. 2.

The binary counter (e.g., a 2 bit counter) receives the imaginary coefficients of the mapped symbols from the binary channelized data symbol generator 20, and counts the received imaginary coefficients. When the imaginary coefficient of the binary channelized data symbol generator 20 is 0, the binary counter 30 is initialized to 00. When the imaginary coefficient of the binary channelized data symbol generator 20 is 1, the binary counter 30 is initialized to 01.

The first XOR circuit XOR1 calculates the XOR values for the most significant bit and the least significant bit of the binary counter 30, and outputs the resulting values to the second XOR circuit XOR 2. The binary scrambling code generator 10 maps the scrambling code to 0 and 1, and outputs the mapped values to the second XOR circuit XOR2.

The second XOR circuit XOR2 calculates the XOR values for the output value from the binary scrambling code generator 10, the output value from the first XOR circuit XOR1, and the real coefficient of the binary channelized data symbol generator 20, and outputs the resulting values to the mapper 40.

The mapper 40 maps the values calculated by the second XOR circuit XOR2 (the binary numbers such as 0 and 1 divided into the real and imaginary parts to the binary numbers such as +1 and −1), and outputs the mapped values to the switch SW1.

The switch SW1 outputs the real or imaginary part of the output values from the mapper 40, according to the least significant bit of the binary counter 30. For example, when the least significant bit of the binary counter 30 is 0, the switch SW1 outputs the code mapped to +1 to the real part. When the least significant bit of the binary counter 30 is 1, the switch SW1 outputs the code mapped to −1 to the imaginary part. In addition, when outputting +1 to the imaginary part, the switch SW1 outputs 0 to the real part, and when outputting +1 to the real part, the switch SW1 outputs 0 to the imaginary part. On the other hand, when outputting −1 to the imaginary part, the switch SW1 outputs 1 to the real part, and when outputting −1 to the real part, the switch SW1 outputs 1 to the imaginary part.

Therefore, in accordance with the present invention, the data symbol mapping, channelizing and scrambling processes can be performed by using binary operations, instead of using complex number multiplications.

The binary channelized data symbol generator 20 of FIG. 2 will now be explained in detail with reference to FIG. 3.

Figure 3:
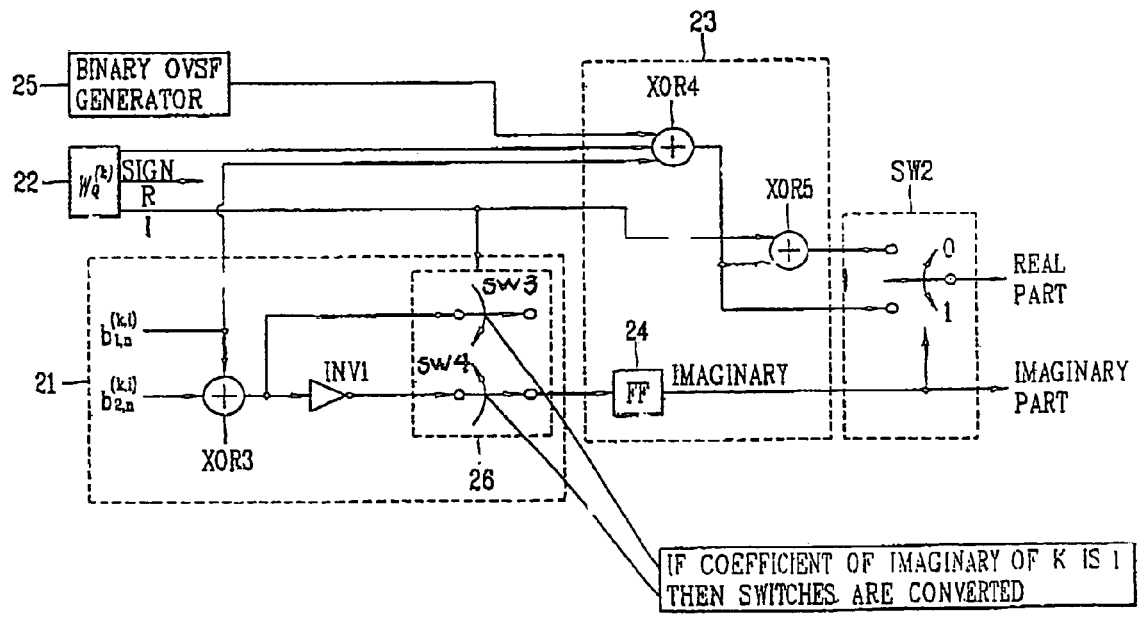
FIG. 3 is a block diagram illustrating a binary channelized data symbol generator of FIG. 2.

FIG. 3 is a block diagram illustrating the binary channelized data symbol generator 20 of FIG. 2. As depicted in FIG. 3, the binary channelized data symbol generator 20 includes a weight sign binary unit 22 for outputting binary numbers such as 0 and 1 corresponding to a sign of a weight, and outputting the binary numbers such as 0 and 1 corresponding to an imaginary number of the weight, a binary symbol unit 21 for XORing two consecutive bit sequences, dividing the resulting values into real and imaginary parts through an inverter circuit, switching the real and imaginary parts according to the binary numbers from the weight sign binary unit 22 corresponding to the imaginary number, and outputting the switched parts, a binary orthogonal variable spreading factor (OVSF) code generator 25 for mapping an OVSF code generated by selection of a spreading factor to 0 and 1, and outputting the mapped values, a binary channelizer 23 for XORing the binary number from the binary symbol unit 21 divided into the real and imaginary parts, the binary number from the weight sign binary unit 22 and the binary number from the binary OVSF code generator 25, and outputting the resulting values, and a switch SW2 for outputting the XORed values (0 and 1 divided into real and imaginary parts) from the binary channelizer 23. Here, the switch SW2 selectively outputs the XORed values from the binary channelizer 23, namely 0 and 1 divided into real and imaginary parts.

The binary symbol unit 21 includes a third XOR circuit XOR3 for XORing the two consecutive bit sequences, and outputting the resulting values, an inverter circuit INV1 for generating the imaginary part by inverting a bit corresponding to the value from the third XOR circuit XOR3, and outputting the imaginary part, and a switch 26 for selectively outputting an output bit from the third XOR circuit XOR3 corresponding to the real part and an output bit from the inverter circuit INV1 corresponding to the imaginary part according to a bit for notifying the imaginary part of the weight in the weight sign binary unit 22, or conversely outputting both output bits.

The binary channelizer 23 is comprised of a fourth XOR circuit XOR4 for XORing a bit for deciding the sign of the symbol corresponding to the consecutive bit sequences in the binary symbol unit 21, a bit for notifying the sign of the weight in the weight sign binary unit 22, and a bit sequence based on the binary OVSF code in the binary OVSF code generator 25, and outputting the resulting values, a fifth XOR circuit XOR5 for XORing a bit for notifying the imaginary number of the weight in the weight sign binary unit 22 and a bit sequence from the fourth XOR circuit XOR4, and outputting the resulting values, and a flip-flop 24 for storing a bit corresponding to the imaginary part from the binary symbol unit 21 until the OVSF code is generated.

The operation of the binary channelized data symbol generator 20 will now be described in detail with reference to FIG. 3.

The binary OVSF code generator 25 generates the OVSF code according to the spreading factor, maps +1 values of the code to 0 and −1 values of the code to 1, and outputs the mapped values.

The weight sign binary unit 22 generates and outputs a bit corresponding to the sign of the weight and a bit corresponding to the imaginary number of the weight, respectively. That is, when the sign of the weight is negative, the weight sign binary unit 22 outputs the bit corresponding to negative as 1, and when the sign of the weight is positive, the weight sign binary unit 22 outputs the bit corresponding to positive as 0.

The bit corresponding to the imaginary number of the weight sign binary unit 22 is inputted to the binary symbol unit to decide whether the output bits of the real and imaginary parts of the binary symbol unit 21 need to be switched. That is, if the weight has an imaginary number, the switch SW3 of the binary symbol unit 21 must be switched to closed circuit and the switch SW4 must be switched to open circuit. Otherwise, the switching operation cannot be performed.

The binary symbol unit 21 receives the two consecutive bit sequences, XORs the bit sequences to generate the bit corresponding to the real part, and inverts the bit through the inverter circuit INV1 to generate the bit corresponding to the imaginary part.

As explained above, the switch 26 of the binary symbol unit 21 switches or does not switch the bits corresponding to the real and imaginary parts according to the bit corresponding to the imaginary number from the weight sign binary unit 21. The bit corresponding to the imaginary part from the binary symbol unit 21 is inputted to the flip-flop 24 of the binary channelizer 23, and maintained until the OVSF code is generated.

The fourth XOR circuit XOR4 of the binary channelizer 23 XORs the bit for deciding the sign of the symbol corresponding to the consecutive bit sequences in the binary symbol unit 21, the bit for notifying the sign of the weight in the weight sign binary unit 22, and the bit sequence based on the binary OVSF code in the binary OVSF code generator 25, and outputs the resulting values.

The fifth XOR circuit XOR5 of the binary channelizer 23 XORs the bit for notifying the imaginary number of the weight in the weight sign binary unit 22 and the bit sequence from the fourth XOR circuit XOR4, and outputs the resulting value. The fourth and fifth XOR circuits XOR4 and XOR5 correspond to the bit operation process for multiplying the bits corresponding to the real and imaginary parts by the code and imaginary number.

The bits corresponding to the real and imaginary parts from the binary channelizer 23 are switched through the switch SW2 by the imaginary part. The final output value becomes a result of the complex number value mapping the binary data to the symbol and channelizing the mapped symbol.

As a result, the symbol mapping and channelizing processes can be performed using binary operations, without requiring symbol mapping tables or complex number operations. The output of the channelized data is a real number or pure imaginary number. Whether the output of the channelized data is a real number or pure imaginary number is decided by the real or imaginary coefficient of the mapped symbol. The output of the symbol mapping and channelizing processes of FIG. 3 is comprised of the imaginary coefficient of the mapped symbol and the binary value of the channelized signal.

In accordance with the present invention, the apparatus for mapping and spreading data symbols in a 3G mobile communication TDD mode performing QPSK modulation executes symbol mapping and spreading processes by using binary operations, instead of using complex number multiplications, thereby reducing operation processing time and complexity of software and hardware in the mobile communication system.

In addition, the apparatus for mapping and spreading data symbols in the mobile communication system reduces the processing time and complexity of the software and hardware, resulting in improved efficiency of the mobile communication system.

Furthermore, the apparatus for mapping and spreading data symbols in the mobile communication system performs mapping symbol channelizing and scrambling processes while utilizing binary operations, and thus does not require mapping tables and complex number operations.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for mapping and spreading data symbols in a mobile communication system when quadrature phase shift keying modulation is performed in a mobile communication time division duplex mode, the apparatus mapping and spreading the data symbols by using binary operations, said apparatus comprising:
   a binary channelized data symbol generator for generating imaginary coefficients of binary information mapped symbols;
   a binary counter for counting the imaginary coefficients;
   a first XOR circuit for calculating XOR values for the most significant bit and the least significant bit of the binary counter, and outputting the resulting values;
   a binary scrambling code generator for mapping a scrambling code to 0 and 1, and outputting the mapped values;
   a second XOR circuit for calculating XOR values for the output value from the binary scrambling code generator, the output value from the first XOR circuit, and a real coefficient of the symbol mapped by the binary channelized data symbol generator;
   a mapper for mapping the values calculated by the second XOR circuit to binary numbers, and outputting the mapped values; and
   a switch for outputting the output values from the mapper to a real part and an imaginary part according to the least significant bit of the binary counter, wherein the values calculated by the second XOR circuit are binary numbers such as 0 and 1 divided into a real part and an imaginary part.

2. The apparatus of claim 1, which maps and spreads the data symbols by using the binary operations, instead of using complex number operations, to improve efficiency of the mobile communication system.

3. An apparatus for mapping and spreading data symbols in a mobile communication system, comprising:
   a binary counter for counting imaginary coefficients of symbols mapped by a binary channelized data symbol generator;
   a first XOR circuit for calculating XOR values for the most significant bit and the least significant bit of the binary counter, and outputting the resulting values;
   a binary scrambling code generator for mapping a scrambling code to 0 and 1, and outputting the mapped values;
   a second XOR circuit for calculating XOR values for the output value from the binary scrambling code generator, the output value from the first XOR circuit, and a real coefficient of the symbol mapped by the binary channelized data symbol generator;
   a mapper for mapping the values calculated by the second XOR circuit to binary numbers, and outputting the mapped values; and
   a switch for outputting the output values from the mapper to a real part and an imaginary part according to the least significant bit of the binary counter,
   wherein the values calculated by the second XOR circuit are binary numbers divided into a real part and an imaginary part.

4. The apparatus of claim 3, wherein the mapper maps the binary number 0 to the binary number 1, and maps the binary number 1 to the binary number −1.

5. The apparatus of claim 3, wherein the binary channelized data symbol generator comprises:
   a weight sign binary unit for outputting binary numbers corresponding to a sign of a weight, and outputting the binary numbers corresponding to an imaginary number of the weight;
   a binary symbol unit for XORing two consecutive bit sequences, dividing the resulting values into real and imaginary parts through an inverter circuit, switching the real and imaginary parts according to the binary numbers from the weight sign binary unit corresponding to the imaginary number, and outputting the switched parts;
   a binary orthogonal variable spreading factor code generator for mapping an orthogonal variable spreading factor code generated by selection of a spreading factor to 0 and 1, and outputting the mapped values;
   a binary channelizer for XORing the binary number from the binary symbol unit divided into the real and imaginary parts, the binary number from the weight sign binary unit and the binary number from the binary orthogonal variable spreading factor code generator, and outputting the resulting values; and
   a second switch for selectively outputting the XORed values from the binary channelizer.

6. The apparatus of claim 5, wherein the second switch selectively outputs 0 and 1 from the binary channelizer divided into the real and imaginary parts.

7. The apparatus of claim 5, wherein the binary symbol unit comprises:
   a third XOR circuit for XORing the two consecutive bit sequences, and outputting the resulting values;
   an inverter circuit for generating an imaginary part by inverting a bit from the third XOR circuit, and outputting the imaginary part; and
   a third switch for selectively switching an output bit from the third XOR circuit corresponding to the real part and an output bit from the inverter circuit corresponding to the imaginary part according to a bit for notifying the imaginary part of the weight in the weight sign binary unit.

8. The apparatus of claim 5, wherein the binary channelizer comprises:
   a fourth XOR circuit for XORing a bit for deciding the sign of the symbol corresponding to the consecutive bit sequences in the binary symbol unit, a bit for notifying the sign of the weight in the weight sign binary unit, and a bit sequence based on the binary orthogonal variable spreading factor code in the binary orthogonal variable spreading factor code generator, and outputting the resulting values;
   a fifth XOR circuit for XORing a bit for notifying the imaginary number of the weight in the weight sign binary unit and a bit sequence from the fourth XOR circuit, and outputting the resulting values; and
   a flip-flop for storing a bit corresponding to the imaginary part from the binary symbol unit until the orthogonal variable spreading factor code is generated.

9. A method of mapping and spreading data symbols in a mobile communication system, comprising:
   generating imaginary coefficients of binary information mapped symbols;
   counting said imaginary coefficients;

calculating first exclusive-OR values for a most significant bit and a least significant bit of the count value;
outputting said calculated first exclusive-OR values;
mapping a scrambling code to binary numbers;
outputting mapped values;
calculating second exclusive-OR values for said outputted mapped values, said outputted calculated first exclusive-OR values, and a real coefficient of one of said mapped symbols;
mapping said calculated second exclusive-OR values to binary numbers;
outputting said mapped calculated second exclusive-OR values;
outputting said outputted mapped calculated second exclusive-OR values to at least one of a real part or an imaginary part according to said least significant bit; and
transmitting information from a mobile terminal based on at least one of said real part or imaginary part output according to said least significant bit.

10. The method of claim 9, wherein said calculated second exclusive-OR values are binary numbers which are divided into a real part and an imaginary part.

11. The method of claim 9, wherein quadrature phase shift keying modulation is performed in the mobile communication system in a mobile communication time division duplex mode.

12. A method of mapping and spreading data symbols in a mobile communication system, comprising:
performing data symbol mapping; and
performing data symbol spreading, wherein said data symbols are mapped and spread using binary operations as follows:
generating imaginary coefficients of binary information mapped symbols;
counting said imaginary coefficients;
calculating first exclusive-OR values for a most significant bit and a least significant bit of the count value;
outputting said calculated first exclusive-OR values;
mapping a scrambling code to binary numbers;
outputting mapped values;
calculating second exclusive-OR values for said outputted mapped values, said outputted calculated first exclusive-OR values, and a real coefficient of one of said mapped symbols;
mapping said calculated second exclusive-OR values to binary numbers;
outputting said mapped calculated second exclusive-OR values; and
outputting said outputted mapped calculated second exclusive-OR values to a real part and an imaginary part according to said least significant bit.

13. A method of mapping and spreading data symbols in a mobile communication system, comprising:
(a) generating a multiple-bit binary number based on one or more imaginary coefficients output from a data symbol generator;
(b) logically combining predetermined bits of the multiple-bit binary number to generate a logical value;
(c) logically combining a binary scrambling code, the logical value generated in (b), and one or more real coefficients output from the data symbol generator;
(d) mapping a first binary number generated in (c) to a second binary number;
(e) selecting the second binary number to correspond to a real part or an imaginary part based on one of the predetermined bits combined in (b); and
(f) transmitting information from a mobile terminal based on at least one of said real part or imaginary part.

14. The method of claim 13, wherein the predetermined bits logically combined in (b) include most and least significant bits of the multiple-bit binary number generated in (a).

15. The method of claim 13, wherein (b) is performed using an XOR logical circuit.

16. The method of claim 13, wherein, in (d), the first binary number is one of first or second values and the second binary number is one of third or fourth values, wherein at least one of the first or second values is different from the third or fourth values.

17. The method of claim 16, wherein the first value is 0, the second value is +1, the third value is +1, and the fourth value is −1.

18. The method of claim 13, wherein, in (e), the second binary number is selected to correspond to said real part or imaginary part based on a least significant bit of the multiple-bit binary number generated in (a).

19. The method of claim 13, wherein the data symbol generator is a binary channelized data symbol generator.

20. The method of claim 13, wherein the binary scrambling code logically combined in (c) is generated by:
generating a first value by logically combining an orthogonal variable spreading factor (OVSF) code, a bit corresponding to a sign of a weight value, and a bit indicative of a sign of a symbol corresponding to two bit sequences input into a binary symbol circuit;
generating a second value by logically combining a bit corresponding to an imaginary number of said weight value and the first value;
generating an imaginary part which corresponds to a logical combination of said two bit sequence; and
outputting the first value or the second value based on the imaginary part generated by the logical combination of said two bits sequences, wherein the binary scrambling code corresponds to the output first value or second value.

21. An apparatus for mapping and spreading data symbols in a mobile communication system, comprising:
a data symbol generator to generator one or more imaginary coefficients;
a circuit to generate a multiple-bit binary number based on said one or more imaginary coefficients;
a first logical circuit to combine predetermined bits of the multiple-bit binary number to generate a logical value;
a second logical circuit to combine a binary scrambling code, the logical value generated by the first logical circuit, and one or more real coefficients output from the data symbol generator;
a mapper to map a first binary number generated by the second logical circuit to a second binary number; and
a selector to select the second binary number to correspond to a real part or an imaginary part based on one of the predetermined bits combined by the first logical circuit.

22. The apparatus of claim 21, wherein the predetermined bits combined by the first logical circuit include most and least significant bits of the multiple-bit binary number.

23. The apparatus of claim 21, wherein the first and second logical circuits include XOR logical circuits.

24. The apparatus of claim 21, wherein the first binary number is one of first or second values and the second binary number is one of third or fourth values, wherein at least one of the first or second values is different from the third or fourth values.

25. The apparatus of claim 24, wherein the first value is 0, the second value is +1, the third value is +1, and the fourth value is −1.

26. The apparatus of claim 21, wherein the second binary number is selected to correspond to said real part or imaginary part based on a least significant bit of the multiple-bit binary number.

27. The apparatus of claim 21, wherein the data symbol generator is a binary channelized data symbol generator.

28. The apparatus of claim 21, further comprising:
a binary scrambling code generator which:
generates a first value by logically combining an orthogonal variable spreading factor (OVSF) code, a bit corresponding to a sign of a weight value, and a bit indicative of a sign of a symbol corresponding to two bit sequences input into a binary symbol circuit;
generates a second value by logically combining a bit corresponding to an imaginary number of said weight value and the first value;
generates an imaginary part which corresponds to a logical combination of said two bit sequence; and
outputs the first value or the second value based on the imaginary part generated by the logical combination of said two bits sequences, wherein the binary scrambling code corresponds to the output first value or second value.

* * * * *